(12) United States Patent
Dowdy

(10) Patent No.: US 9,282,193 B2
(45) Date of Patent: Mar. 8, 2016

(54) CALL ROUTING

(71) Applicant: Verizon Patent and Licensing Inc., Arlington, VA (US)

(72) Inventor: Paul R. Dowdy, Woodland Park, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 14/252,071

(22) Filed: Apr. 14, 2014

(65) Prior Publication Data

US 2014/0307731 A1 Oct. 16, 2014

Related U.S. Application Data

(63) Continuation of application No. 12/333,620, filed on Dec. 12, 2008, now Pat. No. 8,699,690.

(51) Int. Cl.
*H04M 7/00* (2006.01)
*H04M 3/523* (2006.01)
*H04M 3/493* (2006.01)
*H04M 3/56* (2006.01)

(52) U.S. Cl.
CPC ............ *H04M 7/006* (2013.01); *H04M 3/5234* (2013.01); *H04M 3/493* (2013.01); *H04M 3/56* (2013.01)

(58) Field of Classification Search
CPC ................ H04L 2012/5627; H04L 2012/5678
USPC ............ 370/352; 379/221.01, 221.03, 221.09
See application file for complete search history.

(56) References Cited

U.S. PATENT DOCUMENTS

| | | | |
|---|---|---|---|
| 6,085,243 A | 7/2000 | Fletcher et al. | |
| 6,182,157 B1 | 1/2001 | Schlener et al. | |
| 6,631,409 B1 | 10/2003 | Watson et al. | |
| 6,738,811 B1 | 5/2004 | Liang | |
| 7,003,564 B2 | 2/2006 | Greuel et al. | |
| 7,313,735 B1 | 12/2007 | Levergood et al. | |
| 7,447,194 B1 | 11/2008 | Schlesener et al. | |
| 7,689,676 B2 | 3/2010 | Vinberg et al. | |
| 7,782,907 B2 | 8/2010 | Agrawal | |
| 7,804,832 B2 | 9/2010 | Andrews et al. | |
| 7,849,367 B2 | 12/2010 | Srivastava et al. | |
| 7,849,368 B2 | 12/2010 | Srivastava et al. | |
| 7,899,892 B2 | 3/2011 | Tremblay et al. | |
| 7,933,743 B2 | 4/2011 | Golani et al. | |
| 8,102,993 B2 | 1/2012 | Wang et al. | |
| 2001/0027491 A1 | 10/2001 | Terretta et al. | |
| 2002/0016911 A1 | 2/2002 | Chawla et al. | |
| 2002/0165892 A1 | 11/2002 | Grumann et al. | |
| 2004/0220830 A1 | 11/2004 | Moreton et al. | |
| 2005/0160429 A1 | 7/2005 | Hameleers et al. | |
| 2006/0048017 A1 | 3/2006 | Anerousis et al. | |
| 2006/0209695 A1 | 9/2006 | Archer et al. | |

(Continued)

*Primary Examiner* — William Deane, Jr.

(57) ABSTRACT

An inbound traffic allocation module is configured to store, in a database, data received from a plurality of site-services, and to determine a route capacity based at least in part on the received data, data received from each of the site-services including data related to at least one of a health and a busyness of the site-service. A traffic manager module is configured to retrieve the data from the site-services and to provide the data to the inbound traffic allocation module. A service selection engine module is configured to receive a request to route a call, and to route the call to one of the site-services based at least in part on the route capacity associated with the site-service.

20 Claims, 6 Drawing Sheets

(56) References Cited

U.S. PATENT DOCUMENTS

| | | |
|---|---|---|
| 2006/0242300 A1 | 10/2006 | Yumoto et al. |
| 2007/0201677 A1 | 8/2007 | Bates et al. |
| 2007/0266148 A1 | 11/2007 | Ruiz et al. |
| 2008/0118052 A1 | 5/2008 | Houmaidi et al. |
| 2008/0159262 A1 | 7/2008 | Crable et al. |
| 2008/0192915 A1 | 8/2008 | Wang et al. |
| 2010/0015958 A1 | 1/2010 | Dell'Uomo et al. |
| 2010/0030905 A1 | 2/2010 | Fikouras et al. |
| 2010/0208634 A1 | 8/2010 | Eng et al. |
| 2012/0016983 A1 | 1/2012 | Ruiz et al. |

CALL ROUTING

CROSS REFERENCE TO RELATED APPLICATIONS

This application is a continuation of U.S. patent application Ser. No. 12/333,620, filed on Dec. 12, 2008, now U.S. Pat. No. 8,699,690, Issued Apr. 15, 2014, the contents of which are hereby incorporated by reference in its entirety.

BACKGROUND INFORMATION

Calls originating from both a public switched telephone network (PSTN) and a packet network may be routed through a packet network. Further, such calls may be provided with various services, such as interactive voice response (IVR), voicemail, call conferencing, prepaid calling, etc. Presently, a network may make decisions about which nodes to use for providing services, and for routing calls, merely on the availability and capability of network nodes. That is, upon routing a call, a network may simply determine what hard-wired circuit connections are available to satisfy needs for the call, and may route the call accordingly. However, present routing mechanisms do not take into account which nodes will best provide, e.g., most reliably and efficiently, services requested for a call.

DETAILED DESCRIPTION OF THE PREFERRED EMBODIMENTS

Figure 1:
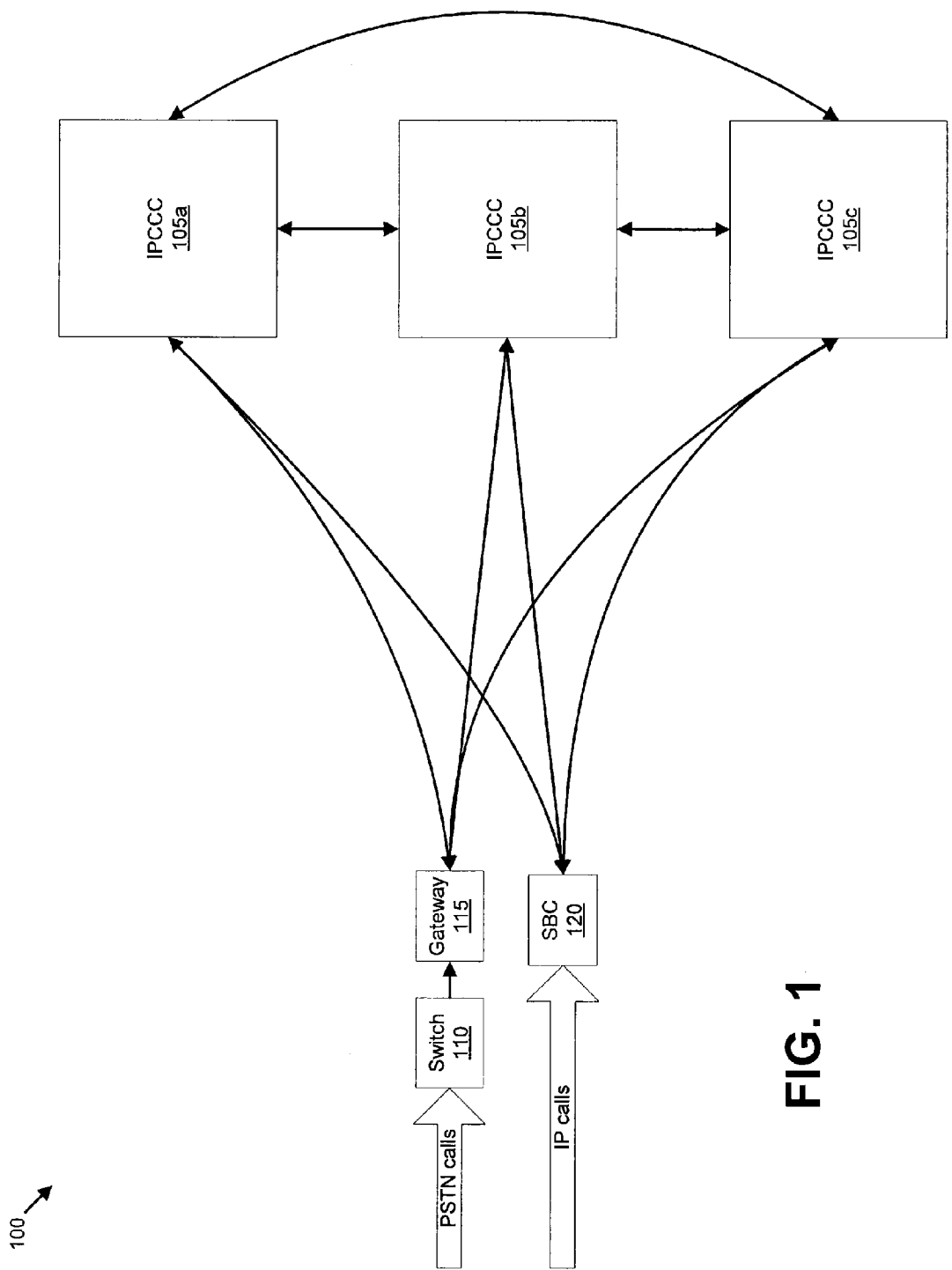
FIG. 1 illustrates an exemplary system for providing call services.

FIG. 1 illustrates an exemplary system 100 for providing call services. As seen in FIG. 1, an Internet Protocol Converged Call Center (IPCCC) 105 may handle calls originated either from a public switched telephone network (PSTN) or a packet network, e.g., an Internet Protocol (IP) network. The system 100 may include one or more IPCCCs 105a, 105b, 105c, etc.

As described in more detail below, each IPCCC 105 provides one or more call services, e.g., IVR, prepaid calling, conferencing, etc. An IPCCC 105 is sometimes referred to as a "node" or a "site." The combination of an IPCCC 105 with a particular service, e.g., IVR, prepaid calling, conferencing, etc. provided at the IPCCC 105 is sometimes referred to as a "site-service." Further, when an inbound call is directed to an IPCCC 105 so that the IPCCC 105 may provide a service with respect to the call, directing the inbound call to the IPCCC 105 is sometimes referred to as "routing" the call. Accordingly, a "call" is "routed" to a "site-service". The set of all site-services for a particular service is sometimes referred to as a "service group."

One IPCCC 105 generally performs routing operations, e.g., makes determinations concerning which IPCCC 105 in system 100 is to handle an inbound call. Thus, where system 100 includes multiple IPCCCs 105, one IPCCC 105, sometimes referred to as the "active" IPCCC 105, is generally designated to perform routing operations.

PSTN-originated calls are provided from a conventional circuit switch 110 to a gateway 115, the gateway 115 being in communication with one or more IPCCCs 105. The gateway 115 generally translates analog calls from a PSTN to a digital format suitable for transmission over a packet network, e.g., according to a protocol such as Internet Protocol.

Packet-originated calls such as IP calls are received by a session border controller (SBC) 120, and provided from the SBC 120 to an IPCCC 105. The SBC 120 may perform the function, for example, of controlling traffic between an IPCCC 105 and a wide area network such as the Internet.

Further, as described in more detail below, IPCCCs 105 send data to and from each other, e.g., via a wide area network such as the Internet, although other kinds of networks could connect IPCCCs 105. For example, multiple IPCCC 105 sites in system 100 may include databases 210 (see FIGS. 2A and 2B), and data may be replicated, e.g., using replication mechanisms provided in many relational database management systems (RDBMS), from one database 210 to one or more other databases 210 for purposes of redundancy.

Figure 2A:
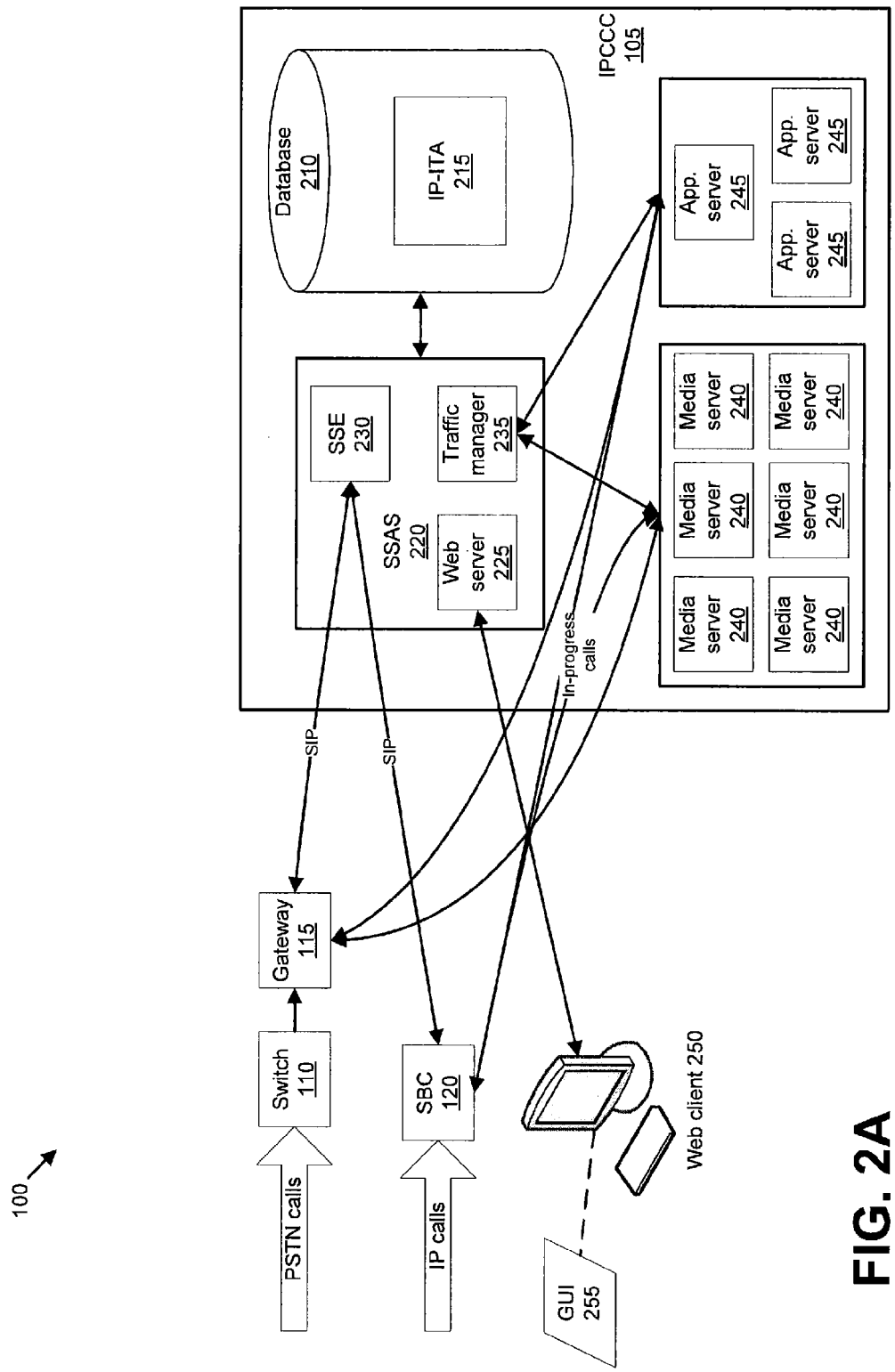
FIG. 2A further illustrates the exemplary system of FIG. 1, including a detailed depiction of an exemplary Internet Protocol Converged Call Center (IPCCC) that includes a database and a Service Selection Application Server.
Figure 2B:
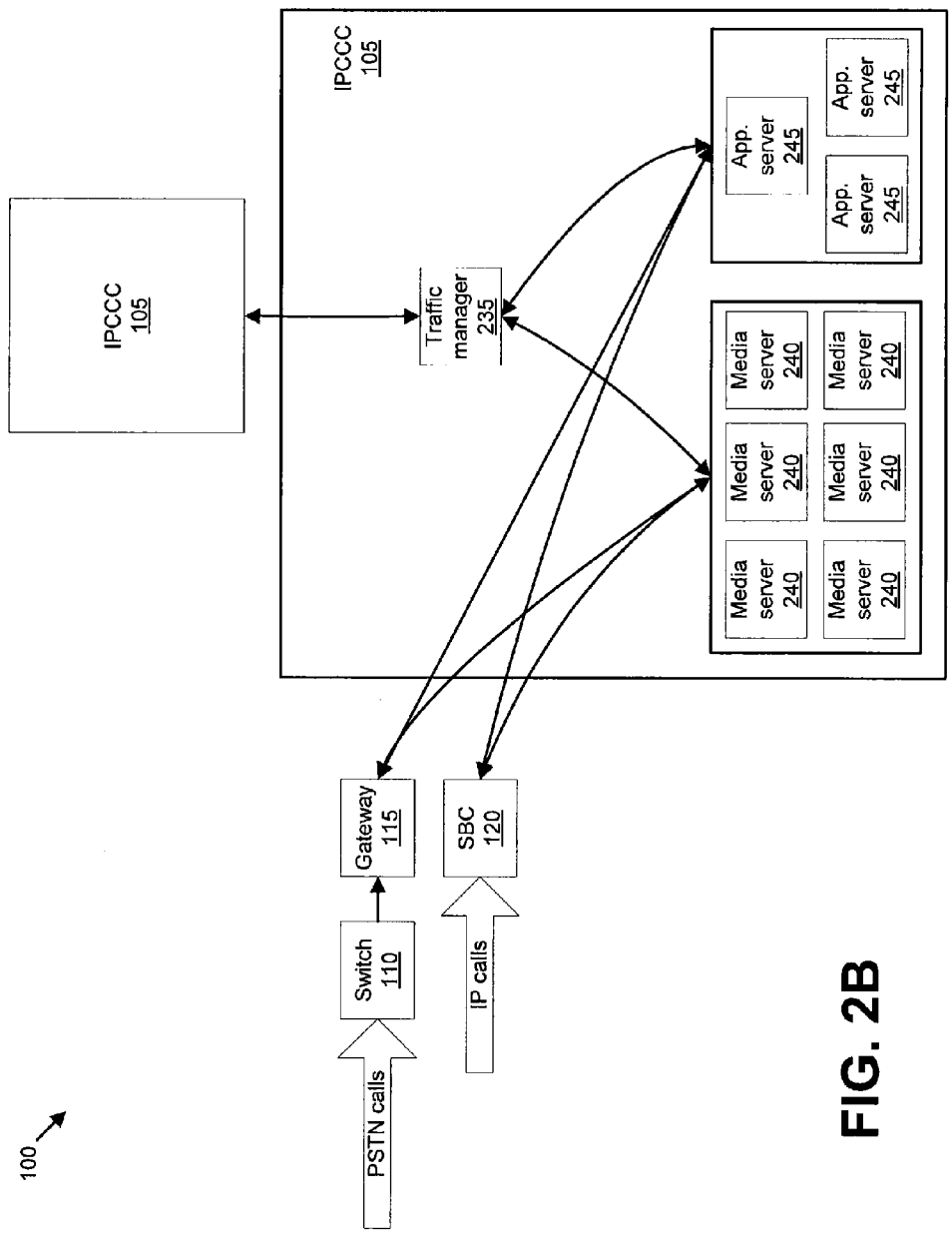
FIG. 2B further illustrates the exemplary system of FIG. 1, including a detailed depiction of an exemplary Internet Protocol Converged Call Center (IPCCC) that does not include a database and a Service Selection Application Server.

FIG. 2A further illustrates the exemplary system 100 of FIG. 1, including a detailed depiction of an exemplary Internet Protocol Converged Call Center (IPCCC) 105 that includes a database 210 and a Service Selection Application Server (SSAS) 220. IPCCC 105 nodes such as illustrated in FIG. 2A, i.e., that include a database 210 and a SSAS 220, are sometimes referred to as "super nodes." On the other hand, IPCCC 105 nodes such as illustrated in FIG. 2B, i.e., that do not include a database 210 and a SSAS 220, are sometimes referred to as "micro nodes."

As seen in FIG. 2A, session initiation protocol (SIP) may be used for messages between SBC 120 and gateway 115, on the one hand, and SSAS 220 on the other. SIP is a signaling protocol that is often used for establishing and terminating communications, e.g., call sessions in a packet network. In the system 100, SIP may be used for messages from gateway 115 and/or SBC 120 to SSAS 220, and based on responses to such messages, to instruct gateway 115 and/or SBC 120 concerning how to route an inbound call.

As just mentioned, database 210 is used to determine how to route inbound calls, e.g., to select an IPCCC 105 to service an inbound call according to one or more services requested by the inbound call. Database 210 includes IP-based Inbound Traffic Allocation (IP-ITA) module 215, as well as tables and files for storing data described herein below. IP-ITA 215 generally includes collection of stored procedures, e.g., written according to the PL/SQL language or some other computer programming language for executing procedures within a database, or for executing procedures using data stored in a database. Examples of such stored procedures are procedures used to determine values such as are described below with respect to FIGS. 3 and 4. IP-ITA 215 generally accesses data stored in database 210 to provide information for routing inbound calls. For example, IP-ITA 215 receives data from each IPCCC 105 in system 100 generally via one or more traffic managers 235 discussed below, and also receives inputs from a network operator, e.g., from web client 250, as described further below.

Database 210 selectively communicates with SSAS 220, which may include one or more computing devices within IPCCC 105. SSAS 220 generally further includes, e.g., as sets of computer-executable instructions stored on computer readable media in the one or more computing devices, modules for variously communicating with gateway 115 and/or SBC 120, a web client 250, one or more media servers 240, one or more application servers 245, and/or database 210. Such modules include a web server 225, a Service Selection Engine (SSE) 230, and a traffic manager 235.

Generally within system 100 multiple IPCCCs 105 include a database 210, although, as discussed below with respect to FIG. 2B, one or more IPCCCs 105 may not include a database 210. Where more than one IPCCC 105 includes a database 210, database replication is performed so that the data in respective databases 210 included in IPCCCs 105 is synchronized. Such synchronization is performed for redundancy purposes, i.e., if the database 210 in the active IPCCC 105 fails, then the database 210 in one of the other IPCCC 105 sites becomes active and provides routing operations as described herein.

The web server 225 provides a graphical user interface (GUI) 255 via the web client 250. Further, the web server 225 receives inputs prompted by the GUI 255, and provide such inputs to web server 225. For example, such inputs may be used to populate tables in database 210 with information used by IP-ITA 215. Accordingly, an operator at web client 250 can provide information used to influence how inbound calls are routed among IPCCCs 105. In general, GUI 255 is used to provide network operators with monitoring, control, and administrative capabilities. Examples of data that may be collected through the GUI 255 are provided and discussed below.

SSE 330 receives inbound SIP requests, e.g., SIP "invite" requests, and, based on a service or services requested by the call, and information retrieved from database 210, including calculations made and stored by IP-ITA 215, selects an appropriate site-service to handle an inbound call. In some implementations, data from database 210 needed for SSE 330 to make routing decisions is retrieved from database 210 and stored in a memory accessible to SSE 330, so that the data is available without the overhead of a query to database 210 when SSE 330 is called upon to make a routing decision. The memory may be refreshed on a periodic basis, e.g., such as may be specified in a "refresh" table or the like in database 210.

Traffic manager 235 is a process that runs at every IPCCC 105 node in system 100. The traffic manager 235 operates to collect statistics related to operation of the IPCCC 105 node. Such statistics and/or metrics calculated on the statistics may be stored in database 210. Examples of such statistics and/or metrics are discussed in more detail below, and include, for example, information relating to busyness, usage, health, etc. of application servers 245 within the IPCCC 105.

Each IPCCC 105 includes one or more media servers 240 that provide various data used for calls routed through the IPCCC 105. For example, if an application server 245 is providing interactive voice response (IVR) functionality for a call, a media server 240 may be used to store and provide audio used during the IVR call. Such audio could include voice, music, etc. that is played in response to various inputs received during the IVR call.

Further, each IPCCC 105 includes one or more application servers 245 that may be used to provide various services for calls routed through the IPCCC 105. For example, application server 245 may provide services such as IVR functionality, prepaid call functionality, conference calling, dual tone multi-frequency (DTMF) dialing, and the like.

Web client 250 may be any computing device that includes a web browser or other software for communicating with Web server 225. Such browser or other software generally includes instructions stored on a computer readable medium included in web client 250, including instructions for rendering GUI 255, receiving inputs, and sending data to and receiving data from web server 225.

FIG. 2B further illustrates the exemplary system 100 of FIG. 1, including a detailed depiction of an exemplary Internet Protocol Converged Call Center (IPCCC) 105 that does not include an SSAS 220 or a database 210. At least one IPCCC 105 in system 100 must include an SSAS 220 and a database 210 for performing operations described herein. In some implementations, every IPCCC 105 in system 100, or at least more than one IPCCC 105, includes an SSAS 220 and a database 210, thereby providing redundancy in the event of a failure in the active IPCCC 105. However, some implementations include one or more IPCCCs 105 that do not include an SSAS 220 or a database 210, thereby avoiding costs and overhead associated with SSAS 220 and database 210.

As can be seen in FIG. 2B, an IPCCC 105 includes a traffic manager 235, which generally includes a set of executable instructions stored in a memory of a computing device included in the IPCCC 105, for execution by a processor included in the computing device. The traffic manager 235 gathers statistics and calculates metrics related to calls handled by the IPCCC 105, as described above and forwards them to the active IPCCC 105.

Figure 3:
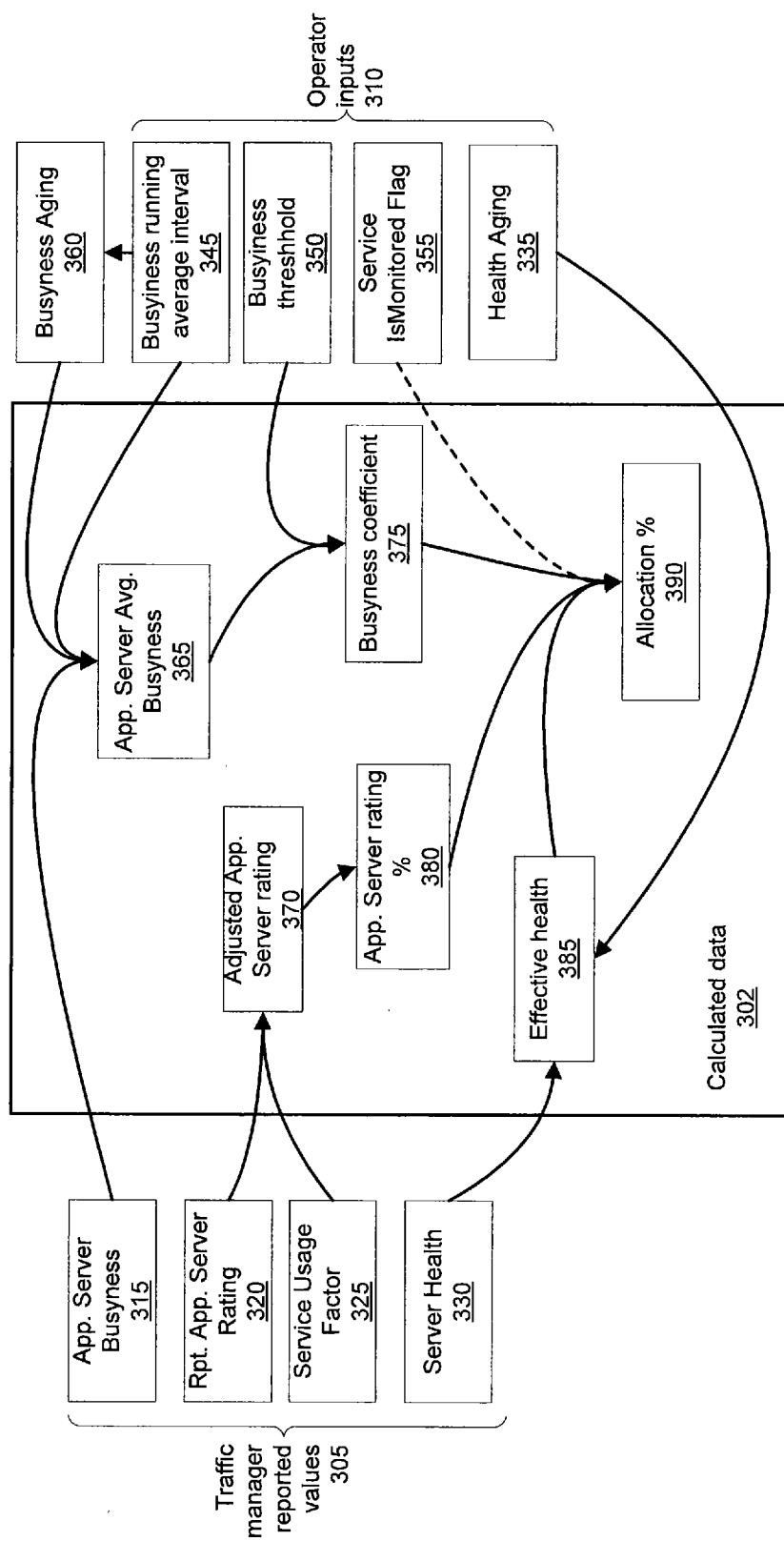
FIG. 3 illustrates certain exemplary data elements that may be stored and/or calculated in a database in an IPCCC.

FIG. 3 illustrates certain data elements that may be stored and/or calculated in database 210, and used by IP-ITA 215. These data elements include a set of calculated data 302, a subset of traffic manager reported values 305, and a set of operator inputs 310. Data elements illustrated in FIG. 3 are generally associated with what is a site-service. That is, at each IPCCC 105 site, various services are provided by application servers 245. Accordingly, data elements may be obtained and/or calculated for each service, e.g., generally according to one or more application servers 245, provided at each IPCCC 105 site, i.e., for each site-service combination in system 100. IP-ITA 215 uses combinations of traffic manager reported values 305, operator inputs 310, and in some cases, calculated data 302, to obtain calculated data values 302. Thus, it may be said that the calculated data 302 is determined in a cascading fashion.

The final calculated data 302 value associated with each site-service, illustrated in FIG. 3, is allocation percentage 390. As described further below, allocation percentage 390 is generally a number on a scale of 0 to 100 indicating a degree to which a site-service presently is allocated to handling calls. Thus, allocation percentage 390 may further be an indicator of availability of a site-service to handle calls, and may be used in making routing determinations, as described in more detail below with respect to FIG. 4.

As mentioned above, calculated data 302 is generally computed according to stored procedures or the like included within IP-ITA 215. Such stored procedures or other program instructions generally make use of traffic manager reported values 305, operator inputs 310, and/or results of other stored procedures to provide various calculated data 302.

Traffic manager reported values 305 are periodically populated in database 215 for various application servers 245 associated with respective IPCCCs 105, and generally for specific site-service combinations. For example, a traffic manager 235 may be configured to provide data to database 215 whenever it has data to report concerning a site-service, an application server 245, or an IPCCC 105 according to various schedules or triggers, e.g., on a periodic schedule for all site-services in an IPCCC 105, when it has accumulated a certain amount of data to report either regarding a site-service or an entire IPCCC 105, etc. Updates of traffic manager reported values 305 in database 215 may trigger stored procedures or the like included in IP-IPA 215 to generate or update one or more values of calculated data 302. Alternatively or additionally, stored procedures determining calculated data 302 may be executed on a periodic basis, maybe manually triggered, etc.

Operator inputs 310 are generally provided by a user of web client 250, e.g., through GUI 255. Accordingly, operator inputs 310 may generally be provided at any time, although of course it is possible to configure database 215 to accept operator inputs 310 only at selected times, or under selected conditions. Updates of operator inputs 310 in database 215 may trigger stored procedures or the like included in IP-ITA 215 to generate or update one or more values of calculated data 302.

Turning to traffic manager reported values 305, application server busyness 315 provides an indication of busyness a particular application server 245 at a particular IPCCC 105. For example, application server busyness 315 may be a percentage value, i.e., on a scale of 0 to 100, indicating the percentage which the application server 245 is being used at a particular moment in time, i.e., the moment in time at which traffic manager 235 measured the busyness of the application server 245. A traffic manager 235 in an IPCCC 105 may measure the busyness of application servers 245 in the IPCCC 105 by, for example, querying operating systems or other application software in the application server 245 to obtain a measure of the current number of calls being processed in the application server 245 versus the maximum number of calls that the application server 245 is capable of processing. Such measure may then be reported as application server busyness 315. Traffic manager 235 generally queries and application server 245 at predetermined intervals, or according to a predetermined schedule, e.g., every 30seconds, to obtain values such as application server busyness 315. Note that an application server 245 may provide multiple services, and therefore application server busyness 315 reflects the busyness of the application server 245 for all services that the application server 245 is used to provide, not just for a particular site-service.

Reported application server rating 320 is a value provided by traffic manager 235 according to a rating associated with a particular application server 245. Reported application server rating 320 is generally a predetermined number stored in a file or in some other way on the application server 245. For example, in one implementation, reported application server rating 320 may be a number ranging from 0 to 99,999. Rating 320 is generally an empirically derived number based on the processor capability of an application server 245, and possibly other factors. Like application server busyness 315, reported application server rating 320 generally pertains to application server 245 for all services provided by the application server 245, not just for a particular site-service.

Service usage factor 325 provides an indication of the degree to which a particular application server 245 in an IPCCC 105 is dedicated to a particular service, e.g., IVR, conference calling, prepaid calling, etc. Accordingly, service usage factor 325 may be a percentage value, i.e., a value on a scale of 0 to 100, indicating the percentage to which the application server 245 may be dedicated to the particular service. Service usage factor 325 can be significant because different services, e.g., DTMF, automated speech recognition, conferencing, etc. may put different demands on an application server 245. For example, conferencing may place more demands on an application server 245 then simple DTMF dialing.

Server health 330 provides an indication of the availability of processes running on an application server 245 that are needed for the application server 245 to provide a particular service. For example, if the particular service is conferencing, server health 330 would provide an indication of the availability of processes running on the application server 245 needed to provide call conferencing. Server health 330 is generally a percentage value, i.e., a value on a scale of 0 to 100. As with other values discussed above, server health 330 may be obtained by querying and operating system or other application software provided on application server 245.

Turning to operator inputs 310, health aging 335 is a factor that is used to determine effective health 385. Health aging 335 may be a period of time, e.g., in seconds, since a report of server health 330 has been received for a particular site-service. In the event that a traffic manager 235 at an IPCCC 105 stops sending data, it is possible to make a determination that the IPCCC 105 is not functioning in its entirety. However, it is also possible to track the amount of time that has passed since the IPCCC 105, i.e., traffic manager 235, has provided information, and to degrade server health 330, generally for all servers 245 at the IPCCC 105, according to the amount of time that has passed since the IPCCC 105 has provided information. Accordingly, as described further below, effective health 385 may be adjusted according to a predetermined percentage based on health aging 335.

Busyness running average interval 345 is a period of time, generally a number of seconds, specified by an operator of web client 250. The interval 345 is the period of time over which an average busyness of an application server 245 is to be calculated.

Busyness threshold 350 is a number between zero and 100. As explained below, busyness threshold 350 provides a threshold of busyness at or above which busyness coefficient 375 is used to reduce the allocation percentage 390 attributed to an application server 245.

Service Is Monitored Flag 355 controls whether allocation percentage 390 should be recalculated for a particular service provided by an application server 245. That is, traffic manager 235 does not provide data relating to all services that may be provided by an application server 245. For example, certain services are controlled only manually. Accordingly, if traffic manager 235 is not monitoring a service for an application server 245, then allocation percentage 390 should not be calculated.

Busyness aging 360 is generally a Boolean value determined according to a determination of whether one or more data relating to application server busyness 315 have been reported within a period of time, e.g., busyness running average interval 345 or some other period of time, e.g., what is sometimes referred to as a "data aging check interval," such as may be provided by an operator of GUI 255. For example, busyness aging 360 may be 0, false, etc. if no data for application server busyness 315 have been reported within busyness running average interval 345 and/or a data aging check interval, or if a predetermined number of data, e.g., less than one reports, less than two reports, etc. have been received within busyness running average interval 345 or other period of time such as a data aging check interval. Otherwise, busyness aging 360 may be 1, true, etc.

Turning now to calculated values 302, application server average busyness 365 represents the sum of application server busyness 315 values recorded during a given busyness running average interval 345, divided by the count of application server busyness 315 values recorded during that busyness running average interval 345. Accordingly, application server average busyness 365 is generally a value ranging from 0 to 100. However, if busyness aging 340 is 0, false, etc., then application server average busyness 365 could be set to an arbitrary value, e.g., −1, 101, etc. to indicate that the particular site-service application server average busyness 365 has not been reliably reported and/or that the particular site-service should not be considered for call routing.

Adjusted application server rating 370 is based on application server rating 320, adjusted according to service usage factor 325. When determining whether to route a call requesting a particular service, it is desirable to evaluate each application server 245 providing the service against other application servers 245 providing the service. Therefore, in an exemplary implementation, adjusted application server rating 370 is the product of application server rating 320, multiplied by service usage factor 325.

Busyness coefficient 375 is generally assigned a value of 1 if busyness threshold 350 equals or exceeds application server average busyness 365. However, if busyness threshold 350 is less than application server average busyness 365, then busyness coefficient 375 is generally established according to the following formula:

$$BC=(100-(AB-BT)/100),$$

where "BC" represents busyness coefficient 375, "AB" represents application server average busyness 375, and "BT" represents busyness threshold 350.

Application server rating percentage 380 is based on adjusted application server rating 370. Application server rating percentage 380 is a number resulting from normalizing application server rating 370 to a scale ranging from 0 to 100.

Effective health 385 is generally a value ranging from 0 to 100, determined according to a value for health 330, reduced if necessary according to health aging 335. A table or the like may be included in database 210 to govern use of health aging 335. Values for such table may be provided by inputs by an operator through, e.g., GUI 255, or may be simply predetermined and stored in database 210. For example, if health aging 335 indicates that no data has been received within a first certain period of time, e.g., 60 seconds, such table could indicate to reduce health 330 by a certain percentage, e.g., 10%, to obtain effective health 385. If no data has been received within a second certain period of time, e.g., 120 seconds, the table could indicate to reduce health 330 by a second certain percentage, e.g. 20%, to obtain effective health 385. Further for example, if health aging 335 indicated that no data had been received within a further certain period of time, e.g., 360 seconds, then such table could indicate that effective health 385 should be set to 0, regardless of a value for health 330. Moreover, such table indicating an influence of health aging 335 on health 330 in determining effective health 385 could include different or additional entries; the foregoing are provided merely for purposes of illustration.

Allocation percentage 390 is determined by multiplying busyness coefficient 375, application server rating percentage 380, and effective health 385 all together, and is generally represented by a number between 0 and 100. An allocation percentage 390 for a service provided by an application server 245 may then be used to determine the site-service route capacity, as described further with respect to FIG. 4.

Figure 4:
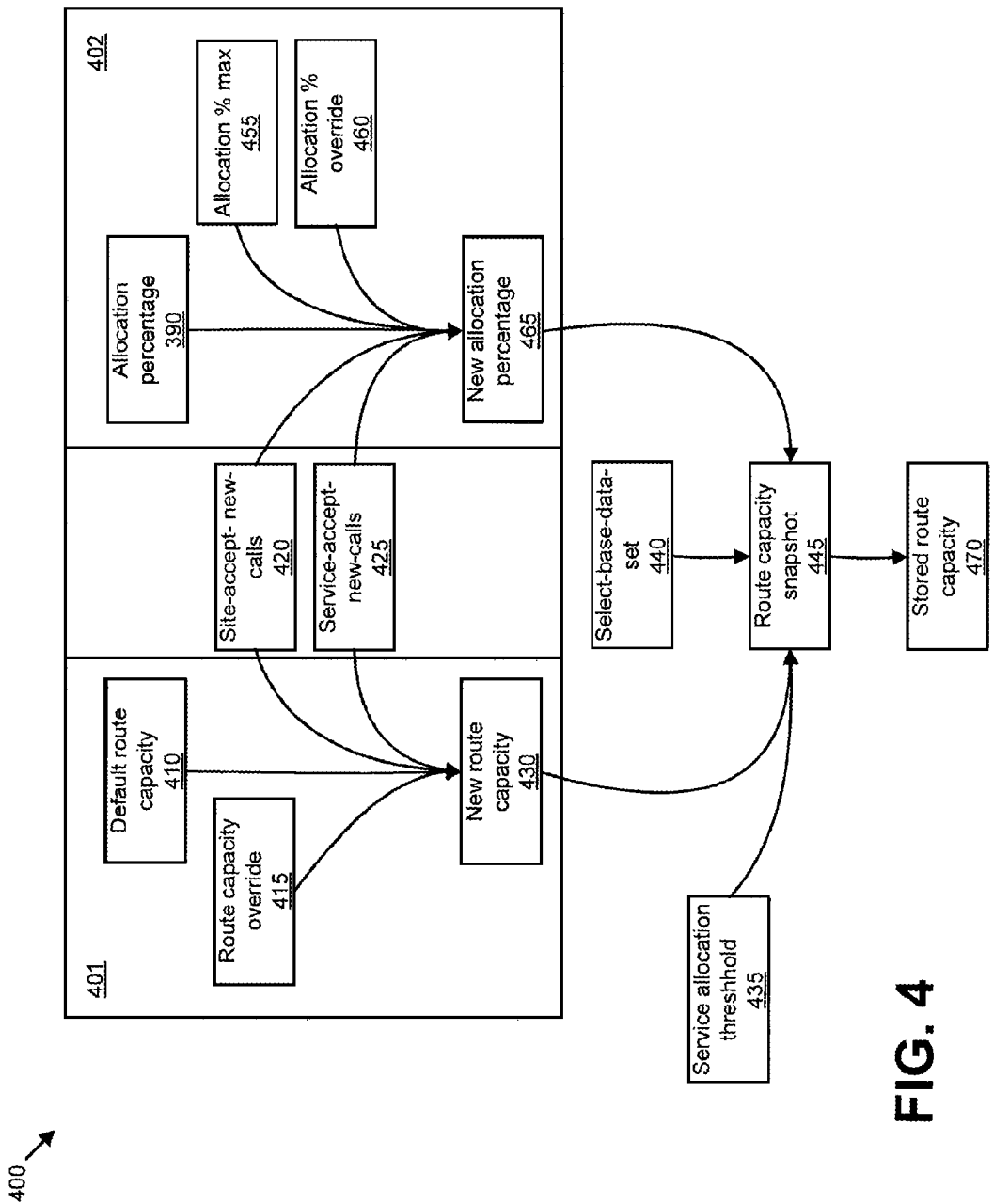
FIG. 4 illustrates an exemplary set of values for determining route capacity of a site-service.

FIG. 4 illustrates a set of values 400 for determining route capacity of a site-service. As will be evident from the explanation that follows, certain of the values 400 are stored in and retrieved from database 210 by IP-ITA 215, whereas other values 400 are calculated by IP-ITA 215, generally using values 400 that were stored in database 210. IP-ITA 215 may compare the determination of route capacity for a particular site-service to determinations of route capacities for other site-services, thereby allowing IP-ITA 215 to identify a site-service for handling an inbound call to SSE 230, e.g., a call through gateway 115 or SBC 120. For example, in one implementation, calls are routed to the site-service having the most capacity.

The set of values 400 includes a first subset of values 401 and a second subset of values 402. Values included in the first subset 401 include default route capacity 410, route capacity override 415, site-accept-new-calls 420, service-accept-new-calls 425, and new route capacity 430. The second subset 402 also includes site-accept-new-calls 420 and service-accept-new-calls 425, and further includes allocation percentage 390, allocation percentage maximum 455, allocation percentage override 460, and new allocation percentage 465. The set of values 400 further includes service allocation threshold 435, select-base-data-set 440, route capacity snapshot 445, and stored route capacity 470.

Default route capacity 410 and allocation percentage 390 are sometimes referred to as "base data sets." That is, default route capacity 410 and allocation percentage 390 provide initial data to be used in calculating route capacity snapshot 445. Generally only one base data set is selected for calculation of route capacity snapshot 445.

Default route capacity 410 is sometimes referred to as a static data set, because the default route capacity 410 of a site-service is a predetermined percentage of capacity associated with the site-service. Limitation, default route capacity 410 is a number ranging from 0 to 100, indicating a capacity of a route, i.e., a site-service, relative to other routes. Because default route capacity 410 is a static number, it may be empirically derived, i.e., based on past experience with a site-service, but is not based on real-time or near real-time data being gathered by a traffic manager 235.

Allocation percentage 390 is sometimes referred to as a dynamic data set, because it is calculated on an ongoing basis, e.g., in real-time or near real-time, according to data collected by one or more traffic managers 235, as described above with respect to FIG. 3.

New route capacity 430 is calculated based on values for route capacity override 415, site-accept-new-calls 420, service-accept-new-calls 425, and default route capacity 410. Route capacity override 415 may provide a value for overriding default route capacity 410 when determining a value for new route capacity 430. Route capacity override 415 is generally set by an operator through GUI 255. For example, in one implementation, possible values for route capacity override 415 include −1 and values ranging from 0 to 100. A value of −1 indicates that default route capacity 410 is not to be overwritten. A value between 0 and 100 indicates that default route capacity 410 is to be overwritten with that value, i.e., the value between 0 and 100 of route capacity override 415, to establish new route capacity 430.

Site-accept-new-calls 420 and service-accept-new-calls 425 are generally Boolean flags indicating when a particular IPCCC 105, and a particular service, e.g. provided by an application server 245, within an IPCCC 105, are respectively accepting new calls e.g., from gateway 115 and/or SBC 120. If, for a particular site-service, either site-accept-new-calls 420 or service-accept-new-calls 425 is set to zero, false, etc., the new route capacity 430 should be set to zero. That is, if a site-service is not accepting new calls, then IP-ITA 215 should determine that that site-service has no route capacity.

New allocation percentage 465 is generally determined based on values for allocation percentage 390, allocation percentage maximum 455, allocation percentage override 460, as well as site-accept-new-calls 420, and a service-accept-new-calls 425. With respect to site-accept-new-calls 420 and service-accept-new-calls 425, as explained above with respect to the determination of new route capacity 430, if a site-service is not accepting new calls, then, like new route capacity 430, new allocation percentage 465 should be set to zero to indicate that the site-service has no capacity to handle inbound calls.

Allocation percentage maximum 455 is generally a value ranging from 0 to 100, providing a maximum value for new allocation percentage 465. That is, if allocation percentage 390 is greater than allocation percentage maximum 455, then new allocation percentage 465 may be set to, at most, the value of application percentage maximum 455.

Allocation percentage override 460 is similar to route capacity override 415. Allocation percentage override 460 is generally set by an operator through GUI 255. Further, allocation percentage override 460 may override, i.e., be used in place of, a value for allocation percentage 390 in the determination of new allocation percentage 465. For example, in one implementation, possible values for allocation percentage override 460 include −1 and values ranging from 0 to 100. If allocation percentage override 460 is −1, then allocation percentage 390 is used in determining new allocation percentage 465, subject to site-accept-new-calls 420, service-accept-new-calls 425, and allocation percentage maximum 455, as described above. However, if allocation percentage override 460 is a value ranging from 0 to 100, then allocation percentage override 460 is used in the determination of new allocation percentage 465, generally subject to site-accept-new-calls 420, service-accept-new-calls 425, and allocation percentage maximum 455.

Select-base-data-set 440 generally has two possible values. A first value may indicate that new route capacity 430 is to be used by IP-ITA 215 in determining route capacity snapshot 445. A second value for select-base-data-set 440 may indicate that new allocation percentage 465 is to be used by IP-ITA 215 in determining route capacity snapshot 445. A value for select-base-data-set 440 may be determined according to input by an operator, e.g., via GUI 255.

Service allocation threshold 435 is generally a value ranging from 0 to the number of site-services in a service group. Service allocation threshold 435 represents a minimum number of site-services (within a service group) that must have a new route capacity 430 or new allocation percentage 465 (depending on the value of select-base-data-set 440) greater than zero in order for the operator, e.g., user of GUI 255, to be able to request the setting of the route capacity snapshot 445. If a number of site-services (within a service group) with a new route capacity 430 or new allocation percentage 465 (depending on the value of select-base-data-set 440) greater than zero is less than service allocation threshold 435, then IP-ITA 215 is generally configured to prevent route capacity snapshot 445 from being saved in database 210 and stored route capacity 470 cannot be updated using route capacity snapshot 445. For example, if service allocation threshold 435 is set to a value of 5, and there are ten site-services within the applicable service group, and only four of these site-services have a new route capacity 430 or new allocation percentage 465 (depending on the value of select-base-data-set 440) greater than zero, the operator would not be allowed to request that the route capacity snapshot 445 be saved.

Without service allocation threshold 435, it might be possible to "zero-allocate" a call, i.e., to accept a route capacity snapshot 445 as stored route capacity 470 when it is not possible to actually provide the service based on the stored route capacity 470, thereby routing calls to site-services that cannot actually service them. Further, service allocation threshold 435 must be set to zero before it is possible to remove a route, i.e., a service that is part of a site-service combination, service from system 100.

Stored route capacity 470 provides a capacity of a site-service, generally on a scale ranging from 0 to 100.

Stored route capacity 470 could be updated according to a stored procedure in database 210 or other computer-executable instructions. Such instructions could periodically invoke a comparison of the new allocation percentage 465 for each site-service to the corresponding stored route capacity 470, and, if these values were different, stored route capacity 470 could be adjusted to be made equal to new allocation percentage 465, or the stored route capacity 470 could be incrementally adjusted, e.g., increased by five percent, ten, percent, etc., to be made closer in value to the current value for new allocation percentage 465.

Figure 5:
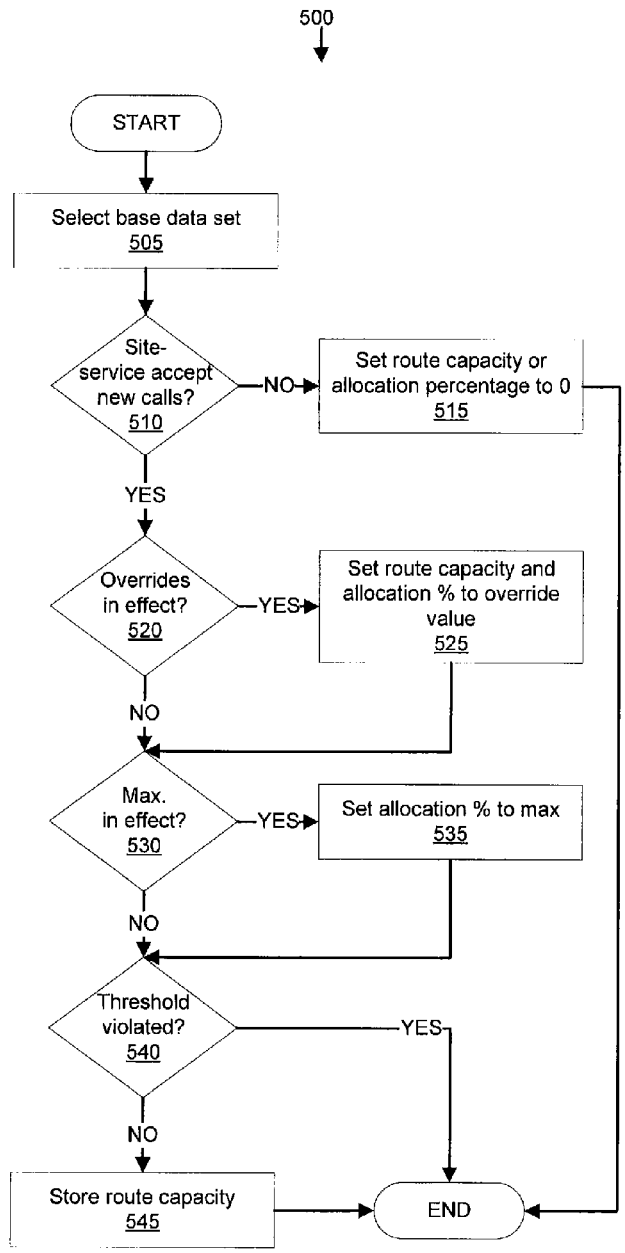
FIG. 5 illustrates an exemplary process for determining stored route capacity for a particular site-service.

FIG. 5 illustrates an exemplary process 500 for determining stored route capacity 470 for a particular site-service. Some or all of the steps of process 500 may be carried out according to computer-executable instructions included in the IP-ITA 215.

The process 500 begins in a step 505, in which a base data set, e.g., a default route capacity 410 or an allocation percentage 390 is selected. For example, such selection may be made according to input received from an operator of GUI 255.

Next, in step 510, IP-ITA 215 checks site-accept-new-calls 420 and service-accept-new-calls 425 flags to determine if the site-service is available to handle inbound calls. If not, step 515 is executed next. However, if the site-service is available to accept new calls, then step 520 is executed next.

In step 515, IP-ITA 215 sets one and generally both of new route capacity 430 and new allocation percentage 465 for the site-service to 0. Following step 515, process 500 ends.

In step 520, IP-ITA 215 determines whether route capacity override 415, or allocation percentage override 460, is in fact, as appropriate, i.e., depending on the base data set selected in step 505. If overrides are in effect, then step 525 is executed next. Otherwise, step 530 is executed next.

In step 525, IP-ITA 215 sets new route capacity 430 or new allocation percentage 465, to the value indicated by route capacity override 415 or allocation percentage override 460, as appropriate. Further, IP-ITA 215 in some implementations may set both route capacity 430 and allocation percentage 465 in step 525, regardless of which base data set was selected in step 505. Step 530 is executed following step 525.

In step 530, which is generally only executed if allocation percentage 390 is the selected base data set, IP-ITA 215 determines whether an allocation percentage maximum 455 has been established. If so, step 535 is executed next. Otherwise, step 540 is executed next.

In step 535, IP-ITA 215 sets new allocation percentage 465 to a value indicated by application percentage maximum 455. Following step 535, step 540 is executed.

In step 540, IP-ITA 215 compares service allocation threshold 435 to the number of site-services with new route capacity 430 or new allocation percentage 465, depending on the base data set selected in step 505. If the number of site-services is less than the service group's service allocation threshold 435, then route capacity snapshot 445 for the service group is not allowed, and process 500 ends. Otherwise, step 545 is executed next.

In step 545, an operator of GUI 255 may review route capacity snapshot 445 and can commit it to the database 210 as stored route capacity 470. Accordingly, if input is received to commit route capacity snapshot 445, IP-ITA 215 stores route capacity snapshot 445 as stored route capacity 470. Otherwise, the process ends. Following step 545, process 500 ends.

Figure 6:
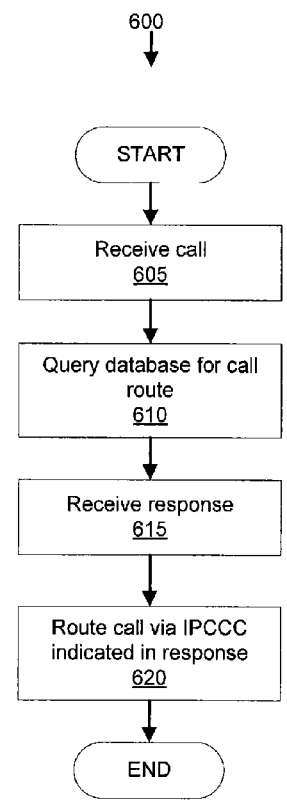
FIG. 6 illustrates an exemplary process for routing a call.

FIG. 6 illustrates an exemplary process 600 for routing a call. Process 600 begins in a step 605, in which an inbound call is received. For example, gateway 115 or SBC 120 may foreword a call to SSE 230, including a request that one or more services be provided for the call.

Next, in step 610, SSE 230 queries database 210, generally by communicating with a module included in IP-ITA 215, to obtain a route, i.e., a site-service, to handle the call.

Next, in step 615, IP-ITA 215 provides a response to SSE 230 to the query sent in step 610. Generally, IP-ITA includes computer-executable instructions for identifying a route for a call in response to such a query, e.g., by identifying a route associated with a stored route capacity 470.

Next, in step 620, the call received in step 605 is routed according to the response received in step 615. That is, SSAS 220 may provide a message or messages to gateway 115 or SBC 120 concerning how to route a call, whereupon gateway 115 or SBC 220 may route the call appropriately. Following step 620, the process 600 ends.

Computing devices such as those discussed herein generally each include instructions executable by one or more processors. For example, processes disclosed herein may be implemented as sets of instructions stored in memories or other media of computers such as server 120, etc., and executable by one or more processors included in such computers. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, tangible media such as a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein, including database 210, may include various kinds of mechanisms for storing, accessing, and retrieving various kinds of data, including a hierarchical database, a set of files in a file system, an application database in a proprietary format, a relational database management system (RDBMS), etc. In one implementation, database 210 includes Oracle version 10 RDBMS software provided by Oracle Corporation of Redwood Shores, Calif. Each such database or data store, including databases 210, is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   determining, by one of a plurality of site-services being associated with an Internet Protocol Converged Call Center, for each of the plurality of site-services, a route capacity that is based at least in part on a health of the site-service and a busyness of the site-service, the one of a plurality of site-services being configured to exchange data with at least one other of the plurality of site-services to perform database replication for redundancy purposes;
   receiving a request to route a call;
   routing the call to one of the site-services based at least in part on the route capacity associated with the site-service;
   determining if a number of the site-services with a route capacity greater than zero is less than a predetermined threshold; and if the number of the site-services with a route capacity greater than zero is less than a predetermined threshold not allowing the route capacity to be updated.

2. The method of claim 1, further comprising:
storing the route capacity for each of the site-services in a data store.

3. The method of claim 1, further comprising:
receiving data from a site-service related to at least one of the health and the busyness of the site-service;
storing the data in a data store; and
using the data in determining the route capacity of the site-service.

4. The method of claim 3, further comprising:
determining an age of the data; and
including the age of the data in the determination of the route capacity of the site-service; to which the data is related.

5. The method of claim 1, further comprising:
receiving an operator input related to at least one of the health and the busyness of the site-service;
storing the data in a data store; and
using the data in determining the route capacity of the site-service.

6. The method of claim 1, further comprising determining the route capacity according to at least one of whether a site is accepting new calls and whether a service in the site is accepting new calls.

7. The method of claim 1, wherein the busyness of the site-service is determined at least in part by querying the site-service for a current number of calls being processed at the site-service, and comparing the current number of calls with a maximum number of calls that the site-service is capable of processing to obtain a busyness value.

8. The method of claim 7, wherein the busyness of the site-service is further determined by summing a plurality of busyness values determined over a set period of time, and dividing the sum by the number of the plurality of busyness values to obtain an average busyness value.

9. The method of claim 8, wherein the busyness of the site-service is further determined by comparing the average busyness value with a busyness threshold value to obtain a busyness coefficient.

10. A non-transitory computer-readable medium comprising instructions executable by a processor of one of a plurality of site-services tangibly embodied thereon, the instructions including instructions for:
determining, for each of the plurality of site-services, a route capacity that is based at least in part on a health of the site-service and a busyness of the site-service;
exchanging data with at least one other of the plurality of site-services to perform database replication for redundancy purposes;
receiving a request to route a call;
routing the call to one of the site-services based at least in part on the route capacity associated with the site-service;
determining if a number of the site-services with a route capacity greater than zero is less than a predetermined threshold; and
if the number of the site-services with a route capacity greater than zero is less than a predetermined threshold not allowing the route capacity to be updated.

11. The non-transitory computer-readable medium of claim 10, the instructions further comprising instructions for:
storing the route capacity for each of the site-services in a data store.

12. The non-transitory computer-readable medium of claim 10, the instructions further comprising instructions for:
receiving data from a site-service related to at least one of the health and the busyness of the site-service;
storing the data in a data store; and
using the data in determining the route capacity of the site-service.

13. The non-transitory computer-readable medium of claim 12, the instructions further comprising instructions for:
determining an age of the data; and
including the age of the data in the determination of the route capacity of the site-service to which the data is related.

14. The non-transitory computer-readable medium of claim 10, the instructions further comprising instructions for:
receiving an operator input related to at least one of the health and the busyness of the site-service;
storing the data in a data store; and
using the data in determining the route capacity of the site-service.

15. The non-transitory computer-readable medium of claim 10, the instructions further comprising instructions for determining the route capacity according to at least one of whether a site is accepting new calls and whether a service in the site is accepting new calls.

16. A system, comprising:
a database;
an inbound traffic allocation module configured to store, in the database, data received from a plurality of site-services, to determine a route capacity based at least in part on the received data, data received from each of the site-services including data related to at least one of a health and a busyness of the site-service, and to exchange data with at least one of the plurality of site-services to perform database replication for redundancy purposes;
a traffic manager module configured to retrieve the data from the site-services and to provide the data to the inbound traffic allocation module;
a service selection engine module configured to receive a request to route a call, and to route the call to one of the site-services based at least in part on the route capacity associated with the site-service;
determining if a number of the site-services with a route capacity greater than zero is less than a predetermined threshold; and
if the number of the site-services with a route capacity greater than zero is less than a predetermined threshold not allowing the route capacity to be updated.

17. The system of claim 16, the inbound traffic allocation module being further configured for storing the route capacity for each of the site-services in a data store.

18. The system of claim 16, further comprising a web server configured to receive at least one operator input concerning one or more site-services, and to store the operator input in the database, the inbound traffic allocation module being further configured to use the operator input in determining the route capacity for at least one of the site-services.

19. The system of claim 16, the inbound traffic allocation module being further configured for:
determining an age of the data; and
including the age of the data in the determination of the route capacity of the site-service to which the data is related.

20. The system of claim 1, the inbound traffic allocation module being further configured for determining the route capacity according to at least one of whether a site is accepting new calls and whether a service in the site is accepting new calls.

* * * * *